Patented Jan. 25, 1949

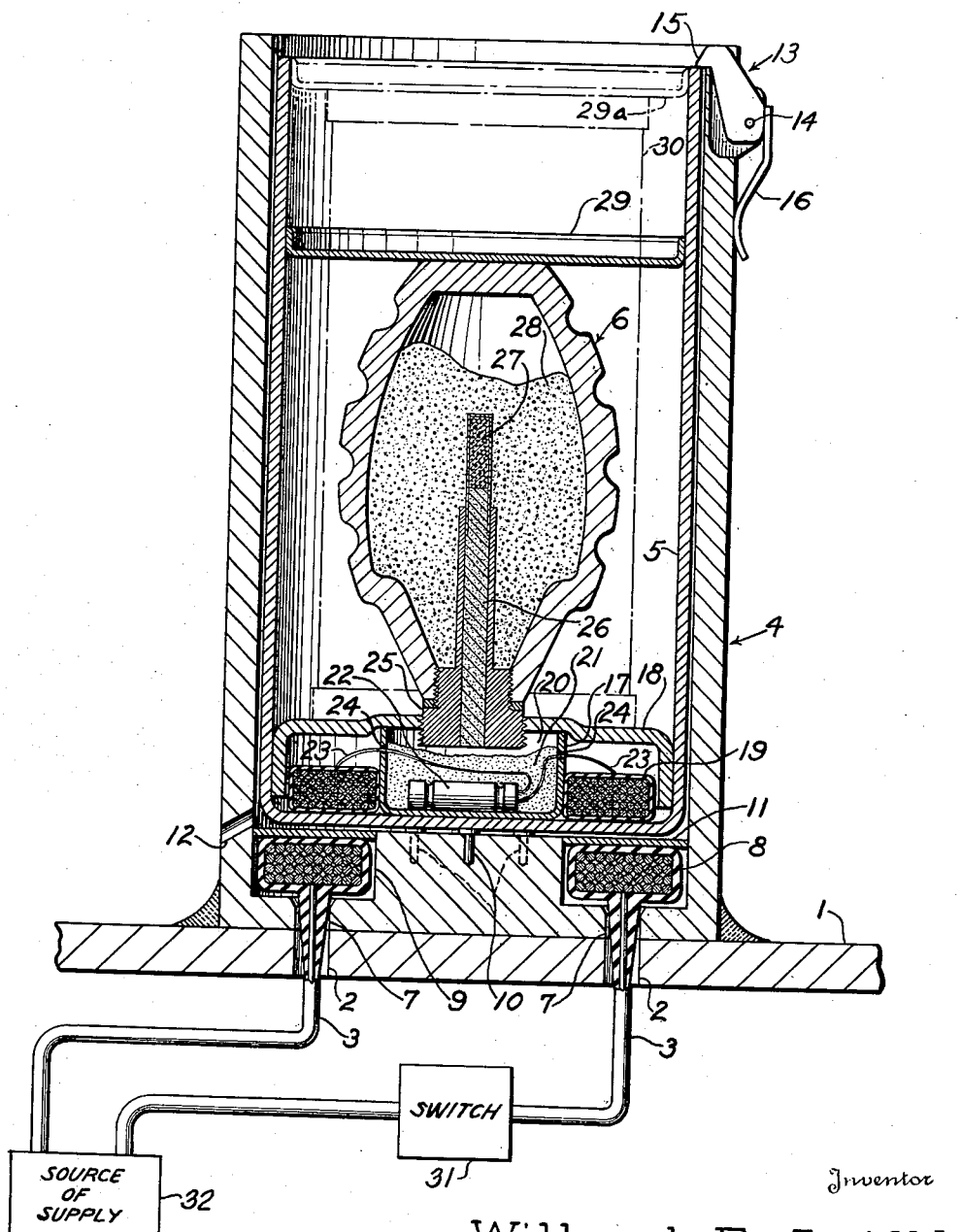

2,459,854

UNITED STATES PATENT OFFICE 2,459,854

GRENADE PROJECTOR

Willard E. Swift, Jr., Foxboro, Mass.

Application April 18, 1946, Serial No. 662,995

6 Claims. (Cl. 89—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to methods for firing grenades and more particularly to an induction fired projector for grenades and smoke canisters.

Effective employment of grenades is not necessarily limited to such methods as manual throwing or launching from firearms. For instance, armored vehicles have found it expedient to mount grenade projectors on the exterior thereof to aid in warding off close attacks by unmounted enemy personnel. Such grenades are obviously fired by remote control devices from within the vehicle. The most efficient means for such remote control detonation of the so-called "deck grenades" is of course an electrical system.

However, difficulties have been encountered with the wiring leads and connections required in such electrical system. Vibration from the vehicle, often of considerable extent in tanks, tends to loosen the wiring connections. Moreover, exposure to the atmosphere of leads and connections induces corrosion of the metal terminals and contacts. In addition there is always the danger of accidental grounding of the lead wires on the metal sides of armored vehicles.

Accordingly it is a purpose of this invention to provide means whereby a grenade or smoke canister may be fired electrically from a fixed projector by remote control without exposing the required wiring leads to the atmosphere.

It is a further purpose of this invention to provide a projector for firing grenades or smoke canisters by electro-magnetic induction.

It is a particular purpose of the invention to provide a projector for firing grenades or smoke canisters by electro-magnetic induction, such projector capable of being mounted on an armored vehicle such as a tank and having the firing switch located within the tank.

The specific nature of this invention as well as other objects and advantages thereof will clearly appear from a description of a preferred embodiment as shown in the accompanying drawing in which:

Fig. 1 is a cross-sectional view of the induction fired grenade projector of this invention.

There is shown in Fig. 1 in assembled relation the induction fired grenade projector of this invention fixedly mounted on the exterior of a combat vehicle, as by welding, to the armor plate 1 thereof. Two openings 2 are provided in the armor plate 1 of the vehicle for the passage of electrical leads 3 leading to a firing switch 31, as shown in Fig. 1, within the armored vehicle. The projector essentially comprises a cylindrical armored holder 4 accommodating a cylindrical projector tube 5 and a grenade 6.

The base of armored holder 4 is provided with openings 7 which are aligned when mounted on a vehicle with openings 2 in armor plate 1 for the passage of electrical leads 3. A coil of wire constituting a primary winding 8 occupies the floor of armored holder 4 and surrounds an integrally raised portion thereof which serves as a core 9 for such winding 8. Anti-residual plugs 10 are provided within core 9 for quicker dissipation of the magnetism in primary winding 8. A metal plate 11 encircling core 9 caps primary winding 8 and serves as a seal against entry of air and moisture and also as a shield against stray magnetic fields. Directly above metal plate 11 a downwardly sloped hole 12 is provided in armored holder 4 in order to drain any possible accumulation of water therein. A retaining latch 13 is secured to the outer top edge of armored holder 4 as by a pin 14. The act of inserting projector tube 5 into holder 4 cams beveled nose 15 of latch 13 against the bias of a flat spring 16. When projector tube 5 is properly seated within armored holder 4, the latch nose 15 returns to its original position and overlaps the top edge of projector tube 5 under the urging of latch spring 16. Projector tube 5 is thus retained within armored holder 4 against displacement therefrom regardless of the position of the projector on the vehicle in question.

A cup-shaped member 17 fits on the floor of projector tube 5 and is positioned substantially in the center thereof. A coil of wire surrounds the sides of cup-shaped member 17 and serves as a secondary winding 19 for the electro-magnetic induction system, the cup-shaped member 17 acting as a core for such winding 19. A grenade-supporting member 18 caps cup-shaped member 17 and thereby defines a firing chamber 20. The sides of grenade-supporting member 18 fit snugly within projector tube 5 and depend downwardly, thereby enclosing secondary winding 19.

Firing chamber 20 contains a propellent charge 21 preferably of cellulose-base flake powder and a firing squib 22 of conventional construction embedded therein. Squib 22 is connected to secondary winding 19 by wiring leads 23 which pass through oppositely disposed openings 24 in cup-shaped member 17. Grenade supporting member 18 is threaded to receive the projecting fuse end 25 of grenade 6. A delay fuse 26 which includes a detonator 27, projects through fuse end 25 up into the explosive 28, or other filler in the body of grenade 6.

When all the components of the grenade projector have been properly assembled, a sealing cap 29 is placed within projector tube 5 over the top of grenade 6, thereby effectively sealing the assembly against the entry of moisture which may prove harmful to the secondary winding 19. Sealing cap 29 is, of course, blown away as grenade 6 is propelled out of projector tube 5.

If desired, a smoke canister 30 (shown in phantom in Fig. 1) may be discharged from the projector assembly of this invention instead of the grenade mentioned herein. In such case, sealing cap 29 will not be seated within projector tube 5 to the depth shown in the figure, since the height of such smoke canister is comparatively greater but will assume the position shown at 29a.

Upon closing switch 31 connected to a source of power 32, current flows into primary winding 8 and builds up a magnetic flux almost instantaneously. This flux induces a voltage impulse in secondary winding 19 which ignites squib 22 and fires the propellent charge 21, thereby launching grenade 6 from projector tube 5. Since the grenade supporting member 18 is secured to grenade 6 by threads, such member 18 obviously accompanies grenade 6 in its flight and is therefore expendable. The grenade 6 bursts in the conventional manner according to the delay inherent in the delay fuse 26.

Thus there is here provided a grenade projector which is effectively sealed against moisture or dirt and which contains no exposed wiring. When unmounted enemy personnel approach too closely to an armored vehicle provided with such grenade projectors, the driver of the vehicle can beat off such attacks without exposing himself by discharging grenades therefrom. These projectors can also be used to fire smoke canisters for the purpose of providing smoke cover for any maneuver in which the vehicle may be participating.

I claim:

1. A projector for discharging a grenade by electro-magnetic induction, said projector comprising, a cylindrical holder having a raised portion on the interior bottom surface thereof, a primary winding surrounding said raised portion, a projector tube having a closed end, said projector tube retained within said holder by latching means, a first cup-shaped member contained within said projector tube, a secondary winding surrounding said cup-shaped member, and a second cup-shaped member abutting the interior of said projector tube and having a threaded opening to receive the fuse end of a grenade, said member enclosing said secondary winding and capping said cup-shaped member to define a firing chamber, said firing chamber having a propellent charge and a firing squib embedded therein, said squib wired to said secondary winding.

2. A projector for discharging a grenade by electro-magnetic induction, said projector comprising, a cylindrical holder having a raised portion on the interior bottom surface thereof, said raised portion being surrounded by a primary winding, a projector tube having a closed end abutting said raised portion of said holder, latching means on said holder preventing displacement of said projector tube, a first cup-shaped member centrally positioned within said projector tube abutting the interior surface of said closed end thereof, said first cup-shaped member being surrounded by a secondary winding, and a second cup-shaped member fitting within said projector tube adjacent the interior walls thereof and having a threaded opening to receive the fuse end of a grenade, said second cup-shaped member capping said first cup-shaped member to define a firing chamber and enclose said secondary winding, said firing chamber having a propellent charge and a firing squib embedded therein.

3. A projector for grenades, smoke canisters, flares, pyrotechnics and the like associated with a vehicle having a source of power, a firing switch and wiring leads extending from the firing switch through openings to the exterior of the vehicle, said projector comprising, a cylindrical holder having a raised portion on the interior bottom surface thereof, a primary winding surrounding said raised portion, said holder having openings in the base thereof aligned with similar openings in the vehicle for the passage of the wiring leads connecting said primary winding, a cap arranged to shield said primary winding from stray magnetic fields, a projector tube latched within said holder, said tube having a closed end abutting said raised portion of said holder, a first cup-shaped member on the bottom within said projector tube capped by a second cup-shaped member to define a firing chamber, and a secondary winding surrounding said first cup-shaped member, said second cup-shaped member inverted within said projector tube to enclose said secondary winding, said firing chamber having a propellent charge and a firing squib embedded therein, said squib wired to said secondary winding, all adapted and arranged whereby closing the switch permits current to flow from the source of power into said primary winding and whereby a magnetic flux is built up in said primary winding to induce a voltage impulse in said secondary winding for igniting said squib.

4. A grenade projector mounted on an armored vehicle having a source of power, a firing switch and wiring leads extending from the firing switch through openings to the exterior of the vehicle adapted to fire a grenade, said projector comprising a cylindrical holder having a raised portion on the interior bottom surface thereof, a primary winding surrounding said raised portion, said holder having openings in the base thereof aligned with similar openings in the vehicle for the passage of the wiring leads connecting said primary winding, a cap arranged to shield said primary winding from stray magnetic fields, a projector tube latched within said holder, said tube having a closed end abutting said raised portion of said holder, a first cup-shaped member on the bottom within said projector tube capped by a second cup-shaped member to define a firing chamber, said second cup-shaped member having a threaded opening to receive the fuse end of a grenade, and a secondary winding surrounding said first cup-shaped member, said second cup-shaped member inverted within said projector tube to enclose said secondary winding, said firing chamber having a propellant charge and a firing squib embedded therein, said squib wired to said secondary winding, all adapted and arranged whereby closing the switch permits current to flow from the source of power into said primary winding and whereby a magnetic flux is built up in said primary winding to induce a voltage impulse in said secondary winding for igniting said squib and discharging the grenade.

5. A projector for discharging a grenade by electro-magnetic induction, said projector comprising a cylindrical holder having a raised portion on the interior bottom surface thereof, said raised portion being surrounded by a primary winding, a projector tube having a closed end abutting said raised portion of said holder, latching means on said holder preventing displacement of said projector tube, a first cup-shaped member centrally positioned within said projector tube abutting the interior surface of said closed end thereof, said first cup-shaped member being surrounded by a secondary winding, a second cup-shaped member fitting within said projector tube adjacent the interior walls thereof, said second cup-shaped member having a threaded opening adapted to receive the fuse end of a grenade which projects into a firing chamber defined by said second cup-shaped member capping said first cup-shaped member, a propellant charge contained within said firing chamber, and a firing squib embedded in said propellant charge, all adapted and arranged whereby the grenade is discharged from said projector tube by electrical ignition of said firing squib and whereby said second cup-shaped member accompanies the grenade when discharged.

6. A grenade projector mounted on an armored vehicle having a source of power, a firing switch and wiring leads extending from the firing switch through openings to the exterior of the vehicle adapted to fire a grenade, said projector comprising a cylindrical holder mounted on the armored vehicle, said holder having openings in the base thereof aligned with similar openings in the vehicle for passage of the wiring leads, a raised portion in the base of said holder being surrounded by a primary winding, a circular plate adapted to cap and seal said primary winding within said holder, said holder having a hole above said circular plate for preventing accumulation of water therein, a projector tube having a closed end abutting said raised portion of said holder, a first cup-shaped member centrally positioned within said projector tube abutting the interior surface of said closed end thereof, said first cup-shaped member being surrounded by a secondary winding, a second cup-shaped member fitting within said projector tube adjacent the interior walls thereof and capping said first cup-shaped member to define a firing chamber, said second cup-shaped member having downwardly depending sides thereby enclosing said secondary winding between said first and second cup-shaped members, said second cup-shaped member having a threaded opening adapted to receive a grenade, said firing chamber having a propellant charge and a firing squib embedded therein, said squib having wires leading from said secondary winding through suitable openings in said first cup-shaped member, and a circular sealing cap inserted within said projector tube over the grenade with the periphery of said sealing cap adjacent the interior walls of said projector tube, all adapted and arranged whereby said primary and secondary windings including the wiring leads thereof are adequately protected from the atmosphere.

WILLARD E. SWIFT, Jr.

REFERENCES CITED

The following references are of record in the file of this patent:

UNITED STATES PATENTS

| Number | Name | Date |
|---|---|---|
| 2,382,862 | Davis | Aug. 14, 1945 |
| 2,400,322 | Wheeler | May 14, 1946 |